United States Patent [19]
Wilson

[11] Patent Number: 5,249,899
[45] Date of Patent: Oct. 5, 1993

[54] HEAD BOLT AND DRIVER THEREFORE

[76] Inventor: Robert L. Wilson, 407 First Ave., Burnham, Pa. 17009

[21] Appl. No.: 967,868

[22] Filed: Oct. 28, 1992

[51] Int. Cl.5 .................... B25B 13/48; F16B 23/00
[52] U.S. Cl. ................................. 411/82; 411/258; 411/410; 81/125; 81/451
[58] Field of Search ............... 411/82, 258, 402, 403, 411/410, 919, 930, 395; 81/121.1, 125, 437, 438, 439, 451; 52/698, 98, 704, 100; 405/259.6

[56] References Cited

U.S. PATENT DOCUMENTS

| | | | |
|---|---|---|---|
| 48,027 | 5/1865 | Park | 81/121.1 |
| 3,283,638 | 11/1966 | Ansingh | 411/410 |
| 3,396,765 | 8/1968 | Ridenour | 81/437 |
| 3,472,301 | 10/1969 | Pearce | 411/258 |
| 3,550,484 | 12/1970 | Pecoraro | 81/125 |
| 4,242,932 | 1/1981 | Barmore | 411/410 |
| 4,601,614 | 7/1986 | Lane | 405/295.6 |
| 4,860,513 | 8/1989 | Whitman | 411/82 |

FOREIGN PATENT DOCUMENTS

| | | | |
|---|---|---|---|
| 253542 | 11/1948 | Switzerland | 81/439 |
| 808614 | 2/1959 | United Kingdom | 81/438 |

Primary Examiner—Peter M. Cuomo
Assistant Examiner—Flemming Saether
Attorney, Agent, or Firm—Leon Gilden

[57] ABSTRACT

A head bolt and associated socket includes a head portion associated with the bolt configured for enhanced grasping thereof by a complementary tool member. A first and second multifaceted stepped torque application head surface of the head bolt are utilized for the spreading of torque loads to the head surfaces of the bolt minimizing distortion by or deformation of the head surfaces during torquing. A modified aspect of the invention includes an adhesive sealing fluid contained within the head bolt selectively utilized and directed by the socket.

4 Claims, 4 Drawing Sheets

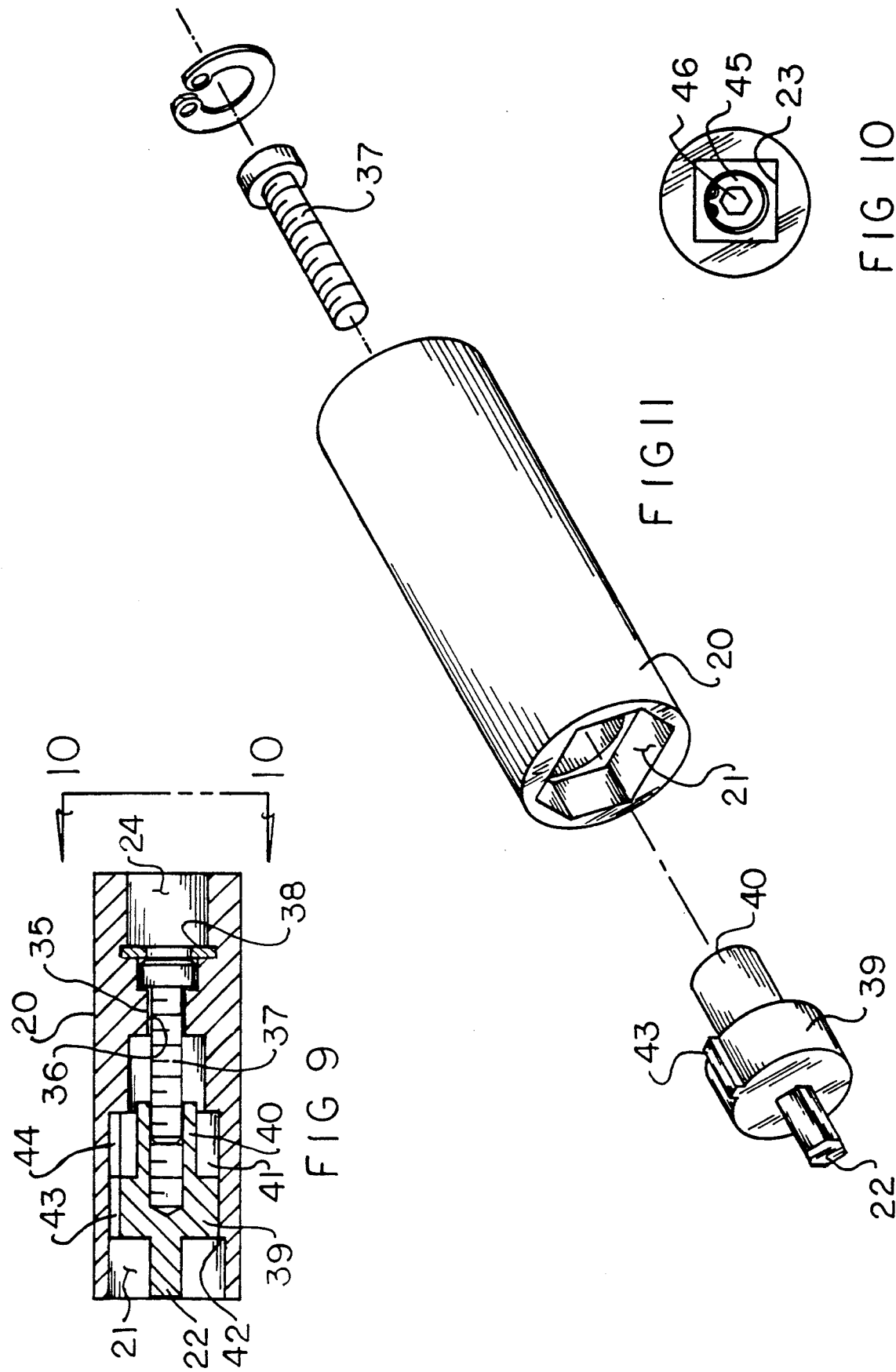

HEAD BOLT AND DRIVER THEREFORE

BACKGROUND OF THE INVENTION

1. Field of the Invention

The present invention relates to bolts, and more particularly pertains to a new and improved head bolt wherein a plurality of stepped six-point head portions are presented of stepped sizes to minimize distortion and destruction of the head bolt during insertion and removal procedures.

Historically, head bolts and particularly head bolts as utilized in smaller engine applications such as lawn mowers, chain saws, snow mobiles, motor boats, and the like are of reduced sizes with associated reduced torque application head surfaces either in six or twelve-point configurations. The smaller head bolts of conventional design have invited rounding off of their respective points making the removal and reinsertion of such head bolts difficult.

2. Description of the Prior Art

The use of head bolts is well known in the prior art. As may be appreciated, these devices are of reduced dimensions with respect to engine application they are intended for. Accordingly, torque application to reduced dimensional head bolt torque receiving surfaces has in the past tended to deform and/or strip the head bolt of its dimensional integrity limiting their effectiveness. In this connection, there have been several attempts to develop head bolt configurations which are of a more effective and efficient application.

SUMMARY OF THE INVENTION

In view of the foregoing disadvantages inherent in the known types of head bolts now present in the prior art, the present invention provides a head bolt which enables multitorque application to a plurality of head surfaces enabling enhanced grasping for removal and application of the improved head bolt. As such, the general purpose of the present invention, which will be described subsequently in greater detail, is to provide a new and improved head bolt which has all the advantages of the prior art head bolts and none of the disadvantages.

To attain this, the present invention comprises a head bolt which includes a first head portion extending axially at a terminal end of the shank of the head bolt and includes a second head portion recessed axially from the first head portion. Both head portions are formed of hexagonal configurations with said second head portion of a reduced dimensional configuration than the first wherein a wrench or an improved socket apparatus may be implemented for application of torque to the improved head bolt.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved head bolt which has all the advantages of the prior art head bolts and none of the disadvantages.

It is another object of the present invention to provide a new and improved head bolt which may be easily and efficiently manufactured and marketed.

It is a further object of the present invention to provide a new and improved head bolt which is of a durable and reliable construction.

An even further object of the present invention is to provide a new and improved head bolt which is susceptible of a low cost of manufacture with regard to both materials and labor, and which accordingly is then susceptible of low prices of sale to the consuming public, thereby making such head bolts economically available to the buying public.

Still yet another object of the present invention is to provide a new and improved head bolt which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an orthographic view, taken along the lines 9—9 of FIG. 7 in the direction indicated by the arrows.

FIG. 10 is an orthographic view, taken along the lines 10—10 of FIG. 9 in the direction indicated by the arrows.

FIG. 11 is an isometric exploded illustration of the socket structure.

DESCRIPTION OF THE PREFERRED EMBODIMENT

Figure 1:
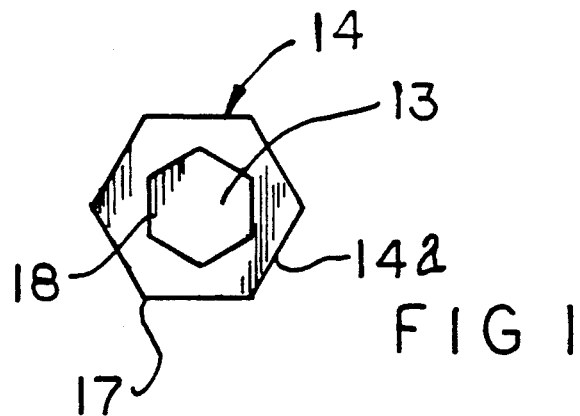
FIG. 1 is a top orthographic view of the head bolt of the instant invention.

With reference now to the drawings, and in particular to FIGS. 1 to 11 thereof, a new and improved head bolt embodying the principles and concepts of the present invention and generally designated by the reference numeral 10 will be described.

Figure 2:
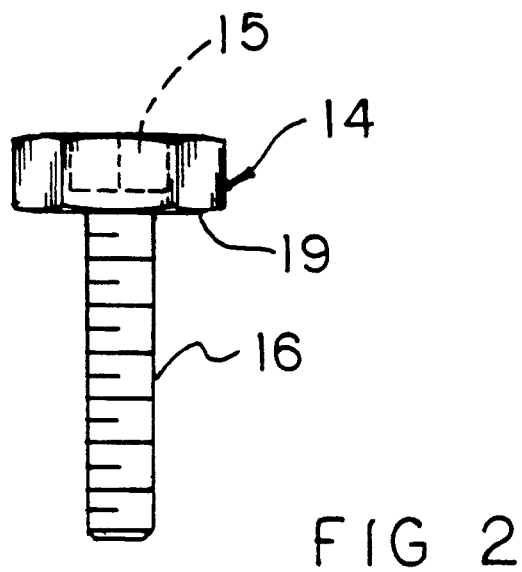
FIG. 2 is an orthographic side view of the head bolt of the instant invention.
Figure 3:
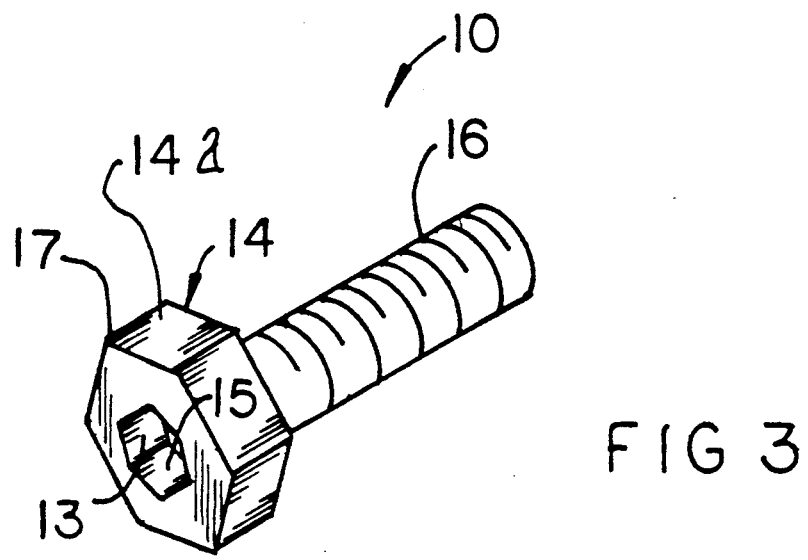
FIG. 3 is an isometric view of the head bolt of the invention.

More specifically, with reference to FIGS. 1 to 3, it will be noted that the head bolt 10 essentially comprises a first head portion 14 and a second head portion 13 configured as a polygonal cavity. The second head cavity portion 13 is of a reduced width dimension between respective flats 15 relative to the dimension of first head portion 14 and the respective dimension between opposed flats 14a of the first head portion. The improved head bolt 10 includes a conventional shank 16 of threaded configuration and size dependent on need and consistent with accepted thread standards. The head bolt 10 is of greater application is reduced sizes for use with smaller internal combustion engines such as lawn mowers and the like, and accordingly head bolt sizes in the range of 10 and ¼ inch, 5/16 inch, and 3/8 inch are of greatest value due to the smaller head sizes of head bolts are of reduced or diminished torque accepting capacities, whereas the improved head bolt design enables simultaneous and greater torque forces to be applied to the head bolt of the instant invention.

The first head bolt portion 14 includes a pressure surface 19 eliminating the need for associated washers with the improved head bolt as the pressure surface 19 distributes pressure over a greater surface area than is conventionally available with typical head bolt arrangements.

Figure 7:
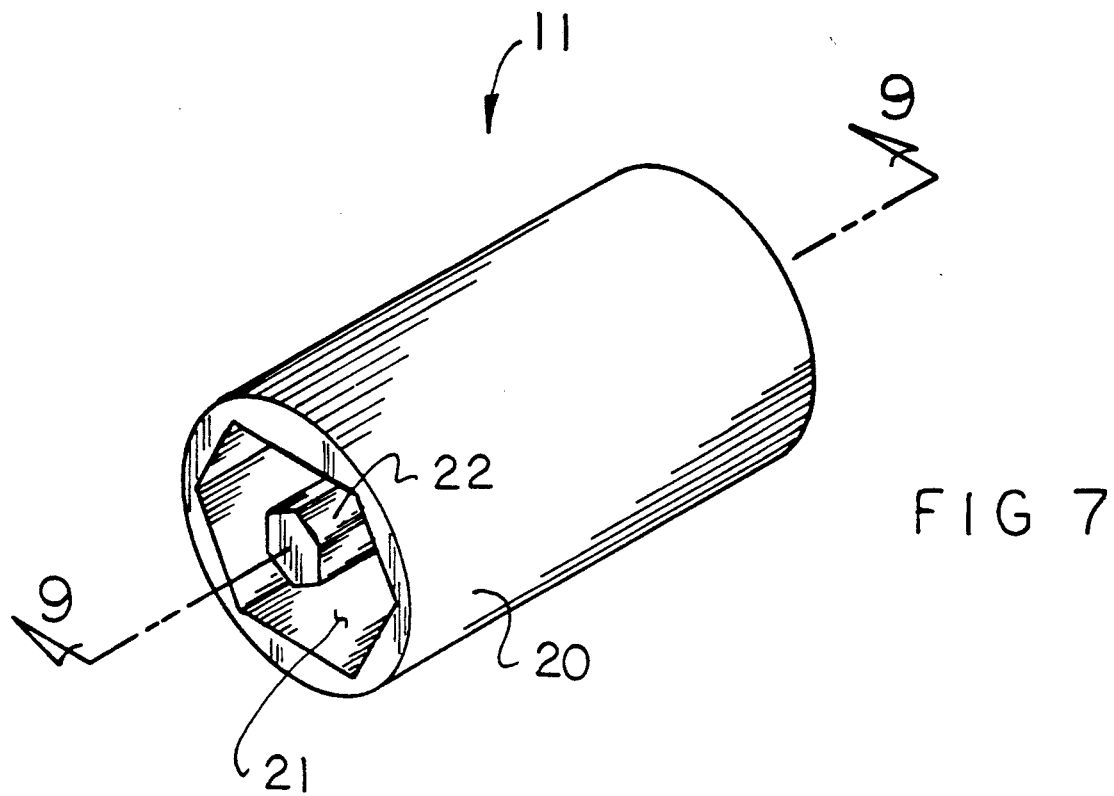
FIG. 7 is an isometric illustration of the socket structure of the invention.
Figure 8:
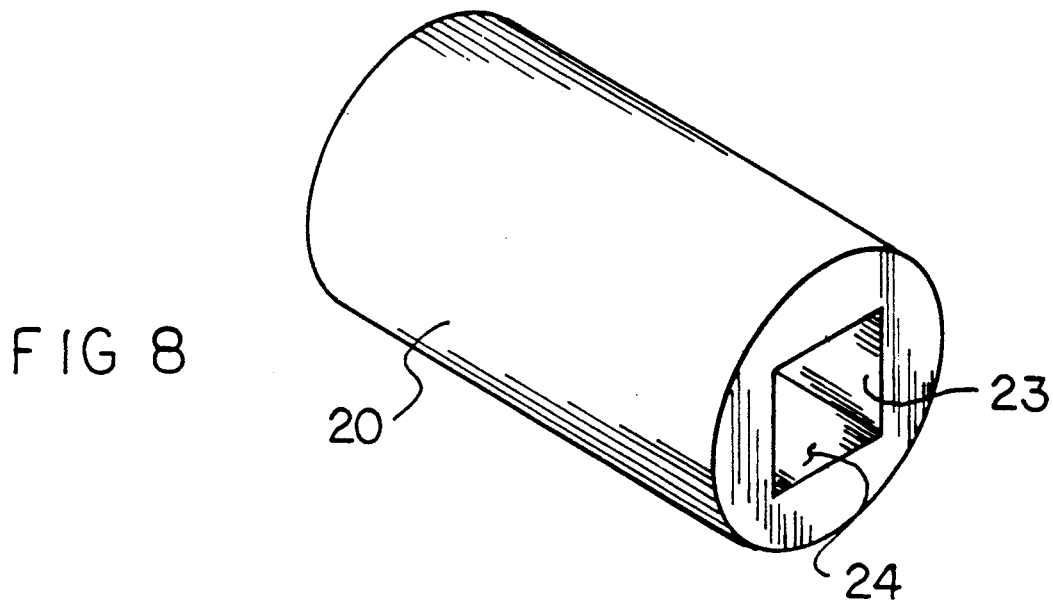
FIG. 8 is a rear isometric view of the socket structure as set forth in FIG. 7.

Notably, second head cavity portion 13 is offset relative to first head portion 12 by thirty degrees about the central axis of head bolt 10 to position a first head edge 17 (at an intersection of adjacent first flats 14a) medially of respective second head edges 18 (at an intersection of adjacent second flats 15) to enhance registration of an associated socket tool 11 illustrated in FIGS. 7 and 8 to complementarily engage and receive the respective heads 12 and 13 for improved torque application.

Reference to FIGS. 7 and 8 illustrates a socket tool 11 for utilization with head bolt 10, wherein a cylindrical body 20 encloses a socket cavity 21 of a first diameter formed with an axially aligned hexagonal projection 22 through a first end of socket tool 11, with a torque tool receiving cavity 24 at the second end coaxially aligned with the projection 22 and socket cavity 21. The projection 22 is normally recessed somewhat within the cavity 21 relative to the first end of the tool 11, such that the socket cavity 21 may complementarily receive and register with the flats 14 initially and thereby act as a guide to enable subsequent registration of projection 22 within the second head portion 13 of head bolt 10. The walls 23 of tool receiving cavity 24 are of a planar configuration and define a parallelepiped of square cross-sectional dimension. Understandably, the depth of the projection 22 and the depth of recess of the socket cavity 21 are of a complementary configuration to the recessed second head portion 13 and first head portion 14 respectively of head bolt 10.

Figure 4:
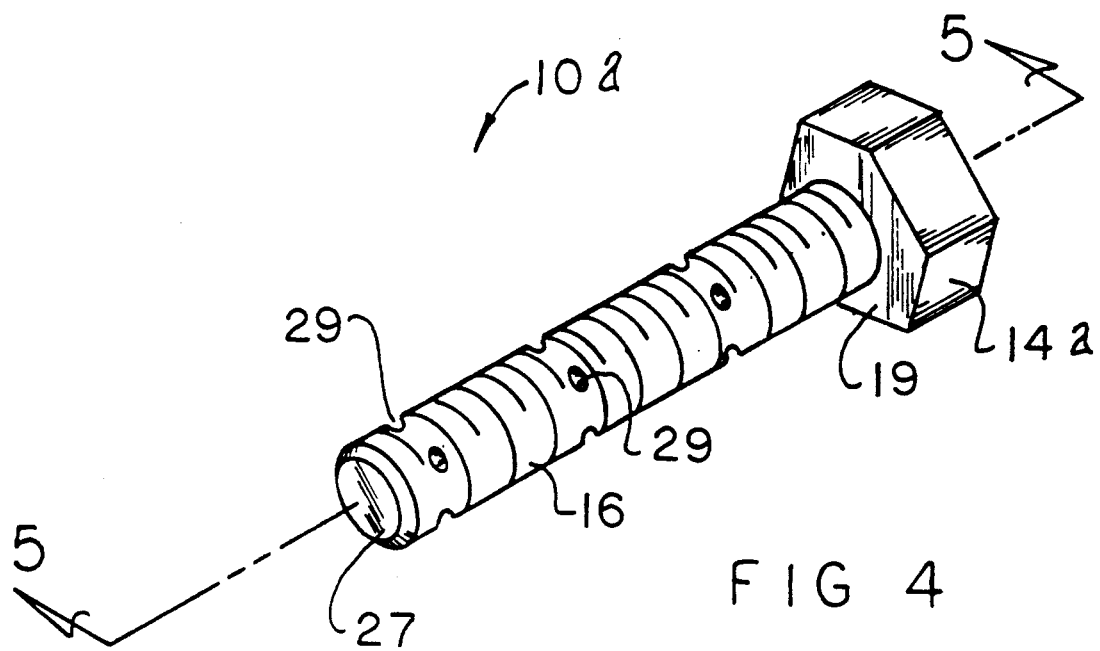
FIG. 4 is an isometric illustration of a modified head bolt structure of the invention.
Figure 6:
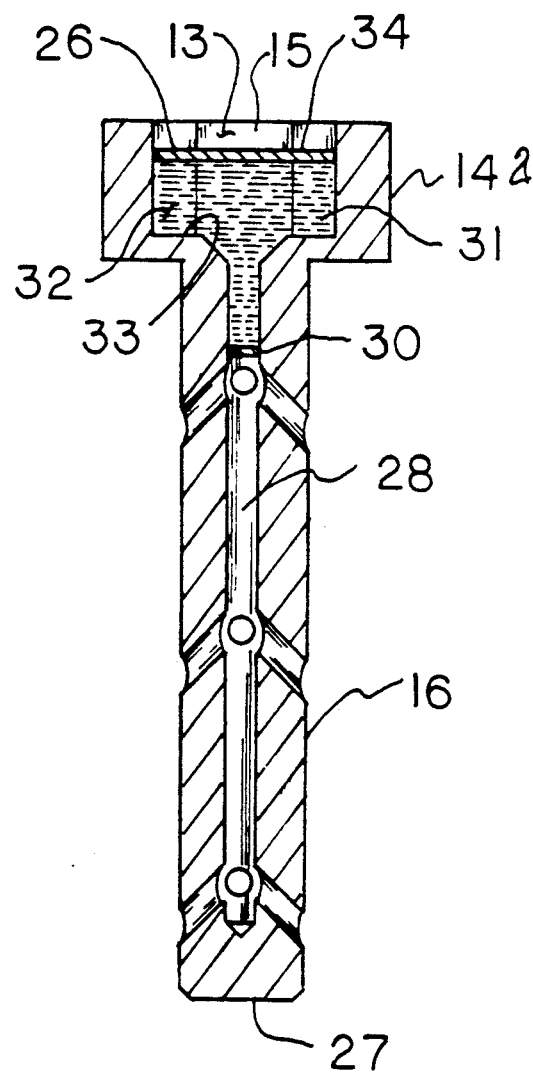
FIG. 6 is an orthographic view of the head bolt structure as set forth in FIG. 4, indicating the adhesive fluid directed through the associated channels therewithin for use in locking of the head bolt to an associated surface.
Figure 5:
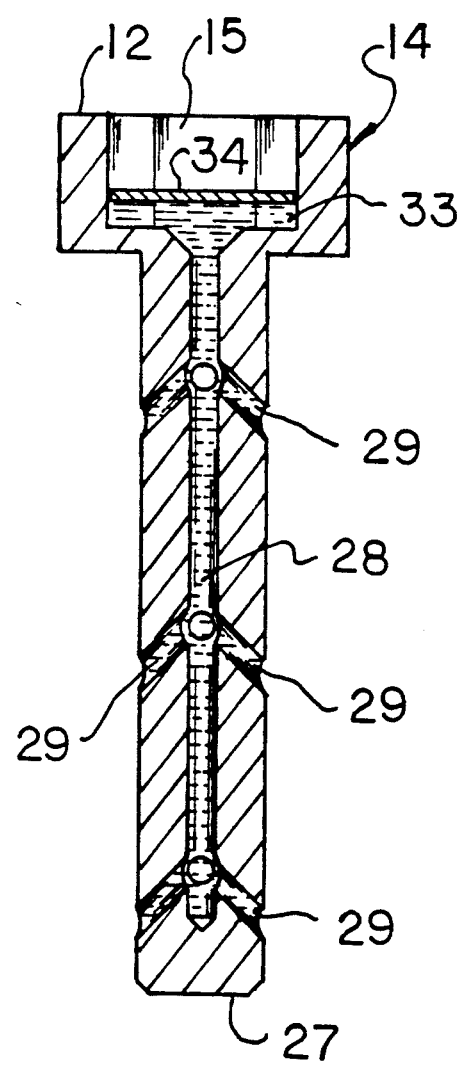
FIG. 5 is an orthographic view, taken along the lines 5—5 of FIG. 4 in the direction indicated by the arrows.

The FIGS. 4–6 indicate a modified head bolt structure 10a, wherein the shank 16 includes a shank channel 28 coaxially aligned with the shank channel 16 spaced from a shank distal end 27 that is at a remote distal end from the pressure surface 19. A plurality of shank channel peripheral channels 29 are in fluid communication with the shank channel and extend to the outer surface of the shank 16. A membrane 30 is mounted within the shank channel 28 between the peripheral channels 29 and the cavity portion 13. A fluid adhesive 31 is mounted within the cavity portion 13 defined within a reservoir 32 that in turn is oriented between a cavity portion floor 33 of the cavity portion 13 and a piston plate 34. In use, projection of the piston plate 34 towards the cavity portion floor 33 ruptures the membrane 30 directing the fluid adhesive 31 through the shank channel 28 and the associated peripheral channel 29 for coating the threads of the shank 16. In this manner, when it is desired to impart such adhesive upon projection of the head bolt into a receiving threaded channel, such may be selectively effected by a user of the organization.

To ease and effect rupture of the membrane 30, the socket tool 11, as indicated in the FIGS. 9-11, includes a socket tool web 35 orthogonally and integrally mounted within the socket tool between the first and second ends thereof. The socket tool web 35 includes a web bore 36 coaxially aligned with the socket tool, with a threaded adjuster bolt 37 rotatably mounted within the web bore 36. A lock ring 38 positioned between the web bore 36 and the second end of the socket secures the adjuster bolt 37 within the web bore coaxially aligned within the socket tool. More specifically, the adjuster bolt 37 includes a bolt head 45 having a bolt head cavity 46 therewithin to receive a tool to effect rotation selectively of the adjuster bolt 37.

A projection piston 39 coaxially and integrally mounts the projection 22 coaxially aligned with a projection piston socket 40 mounted to a second side of the projection piston 39, with the projection 22 mounted to a first side above the projection piston 39. The socket 40 rotatably receives and secures the free distal end of the adjuster bolt 37 therewithin. It should be noted that the projection piston 39 is slidably received within a piston cavity 40 of a second diameter that is less than a first diameter of the socket cavity 21 to define an abutment ledge 42 at an inner face of the piston cavity 41 and the socket cavity 21, with the abutment ledge 42 substantially orthogonally oriented relative to the axis of the socket tool 11 to receive the first head 14 thereon limiting projection of the first head within the socket tool. A piston rib 43 oriented parallel to the axis of the socket tool 11 is fixedly mounted to a periphery of the projection piston 39 and received within a key way slot 44 within the piston cavity 41 to maintain proper alignment of the hexagonal projection 22 oriented relative to the hexagonal socket cavity 21. In this manner, the projection 22 may be recessed within the piston cavity 41 until such time as projection of the piston plate 34 towards the cavity portion floor 33 is desired to direct a fluid adhesive 31 through the various channels within the shank structure. At that time, the adjuster bolt 37 is rotated to direct the projection 22 forwardly towards the first end of the socket 11 to thereby effect displacement of the piston plate 34 towards the cavity portion floor 33 and the ultimate directing of the fluid adhesive 31 through the channels as noted above.

As to the manner of usage and operation of the instant invention, the same should be apparent from the above disclosure, and accordingly no further discussion relative to the manner of usage and operation of the instant invention shall be provided.

With respect to the above desription then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A fastener and socket tool for use in high tension head bolt application arrangements, comprising,
   a fastener including a shank, wherein said shank is defined about an elongate axis terminating in a threaded portion at one end and a torque receiving head means at the other end, and
   said head means including a first torquing head, including a pressure surface proximate said other end, and a second torquing head cavity recessed within said first head remote from said pressure surface, wherein said second torquing head cavity is of a reduced perimeter diameter relative to said first head, and
   a socket tool, and
   said socket tool comprises a body portion defined by a cylindrical external configuration including a first recess for reception of said first torquing head and including a projection positioned within said first recess for positioning within said second torquing head, and a second recess axially displaced from said first recess and projection for reception of a torque application tool wherein said first recess, said projection, and said second recess are coaxially aligned with respect to one another, and the socket tool includes a socket tool web medially of the socket tool, and the socket tool includes a socket tool axis, and the web includes a web bore, and a threaded adjuster bolt, the threaded adjuster bolt rotatably mounted within the web bore coaxially aligned within the socket axis, and the adjuster bolt includes an adjuster bolt head and an adjuster bolt head cavity mounted within the adjuster bolt head, and a lock ring mounted between the bolt head and the second recess, and the first recess including a piston cavity coaxially aligned within the socket tool between the first recess and the second recess with the piston cavity having a projection piston slidably mounted therewithin, the projection piston includes the projection mounted on a first side of said piston, and a second side of said piston including a piston socket, the piston socket receiving the adjuster bolt therewithin spaced from the bolt head, and the piston cavity having a key way slot, and projection piston including a piston rib mounted to a periphery of the piston to maintain alignment of the piston and the projection relative to the first recess, whereupon rotation of the adjuster bolt effects reciprocation of the projection piston within the piston cavity.

2. A fastener and socket tool for use in high tension head bolt applications as set forth in claim 1 wherein said first torquing head and second torquing head cavity are each of hexagonal cross-sectional configuration presenting respective first and second six flats respectively for application of torque thereto.

3. A fastener and socket tool for use in high tension head bolt applications as set forth in claim 2 wherein said second torquing head cavity is rotated thirty degrees relative to said first torquing head such that edges of said first torquing head defined between first flats are medially positioned relative to respective second flats of said second torquing head cavity.

4. A fastener and socket tool as set forth in claim 1 wherein the shank includes a shank distal end spaced from the pressure surface, and the shank includes a shank channel coaxially aligned with the shank and spaced from the shank distal end in communication with the second torquing head cavity, and at least one peripheral channel in fluid communication with said shank channel and is directed through the shank and exiting the shank at a peripheral surface of said shank, and said second torquing head cavity includes a reservoir therewithin, and the second torquing head cavity includes a cavity floor on a first side of said reservoir, and a piston plate, the piston plate mounted on a second side of said reservoir, and a fluid adhesive contained between the piston plate and the cavity floor, and a rupturable membrane mounted within the shank channel between said at least one peripheral channel and the cavity floor to effect rupturing of the membrane and projecting of the fluid adhesive through at least one peripheral channel upon projecting the piston plate towards the cavity floor.

* * * * *